(12) United States Patent
Lin et al.

(10) Patent No.: US 11,263,331 B2
(45) Date of Patent: Mar. 1, 2022

(54) ELECTRONIC DEVICE FOR CHECKING RANDOMNESS OF IDENTIFICATION KEY DEVICE, RANDOM KEY CHECKER CIRCUIT, AND METHOD OF CHECKING RANDOMNESS OF ELECTRONIC DEVICE

(71) Applicant: Taiwan Semiconductor Manufacturing Co., Ltd., Hsinchu (TW)

(72) Inventors: Chien-Chen Lin, Kaohsiung (TW); Hidehiro Fujiwara, Hsin-Chu (TW); Wei-Min Chan, New Taipei (TW); Yen-Huei Chen, Hsinchu County (TW); Shih-Lien Linus Lu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 231 days.

(21) Appl. No.: 16/561,052

(22) Filed: Sep. 5, 2019

(65) Prior Publication Data
US 2020/0104520 A1 Apr. 2, 2020

Related U.S. Application Data

(60) Provisional application No. 62/737,884, filed on Sep. 27, 2018.

(51) Int. Cl.
*H04L 9/08* (2006.01)
*G06F 21/62* (2013.01)

(52) U.S. Cl.
CPC ........ *G06F 21/6209* (2013.01); *H04L 9/0869* (2013.01); *G06F 2221/0755* (2013.01); *H04L 2209/08* (2013.01)

(58) Field of Classification Search
CPC ... H04L 9/0861; H04L 9/0866; H04L 9/0869; H04L 9/088; H04L 9/0891; H04L 9/3278; H04L 2209/08; H04L 2209/26; G06F 21/6209; G06F 2221/0722
See application file for complete search history.

(56) References Cited

U.S. PATENT DOCUMENTS

| | | | |
|---|---|---|---|
| 9,270,455 B1* | 2/2016 | Ts'o | H04L 9/0872 |
| 2016/0170856 A1* | 6/2016 | Kim | G09C 1/00 702/182 |
| 2019/0081804 A1* | 3/2019 | Chen | H04L 9/0869 |

* cited by examiner

*Primary Examiner* — Minh Dinh
(74) *Attorney, Agent, or Firm* — JCIPRNET (57) ABSTRACT

An electronic device for checking a randomness of an identification key device, a random key checker circuit for an electronic device and a method of checking randomness for an electronic device. An electronic device for checking a randomness of an identification key device includes an identification key generator, configured to generate an identification key. A random key checker circuit, configured to receive the identification key from the identification key generator, calculates a randomness value of the identification key according to the identification key for checking a randomness of the identification key and generates an output of the identification key with high randomness.

20 Claims, 9 Drawing Sheets

ELECTRONIC DEVICE FOR CHECKING RANDOMNESS OF IDENTIFICATION KEY DEVICE, RANDOM KEY CHECKER CIRCUIT, AND METHOD OF CHECKING RANDOMNESS OF ELECTRONIC DEVICE

CROSS-REFERENCE TO RELATED APPLICATION

This application claims the priority benefit of U.S. provisional application Ser. No. 62/737,884, filed on Sep. 27, 2018. The entirety of the above-mentioned patent application is hereby incorporated by reference herein and made a part of this specification.

BACKGROUND

In the field of semiconductor manufacturing, the physically unclonable function (PUF) device and random number generator (RNG) device has been proposed and became popular to provide security and uniqueness to integrated circuits. The PUF and RNG device are based on a cryptography which is easy to evaluate and would produce an output, but such output could be hard to predict. Each PUF and RNG device may provide a unique identity based on randomness in the outputs, and such variations are rarely the same for two electrical components such that the randomness would be used to provide a unique identity to each PUF and RNG circuit.

The unique identification key is achieved by improving the randomness in the PUF/RNG device is necessary condition to make the device more secured and hard to decrypt. The device is said to be defect/not secured by the low randomness in the device. Thus, the device need to be filter those low randomness to obtain the high randomness is the target for any PUF/RNG device.

BRIEF DESCRIPTION OF THE DRAWINGS

Aspects of the present disclosure are best understood from the following detailed description when read with the accompanying figures. It is noted that, in accordance with the standard practice in the industry various features are not drawn to scale. In fact, the dimensions of the various features may be arbitrarily increased or reduced for clarity of discussion.

DESCRIPTION OF THE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features ay be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
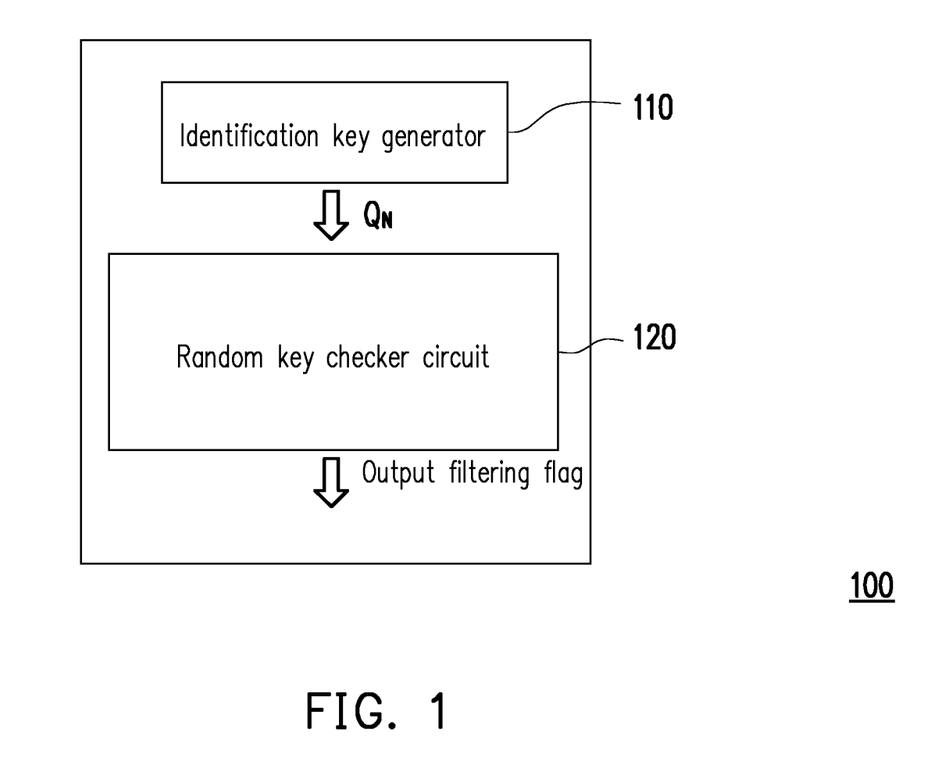
FIG. 1 illustrates a schematic block diagram of an electronic device for checking a randomness of an identification key device according to an exemplary embodiment of the disclosure.

FIG. 1 a schematic block diagram of an electronic device for checking a randomness of an identification key device according to an exemplary embodiment of the disclosure. Referring to FIG. 1, an electronic device 100 includes an identification key generator 110, a random key checker circuit 120. The identification key generator 110, configured to generate an identification key. The identification key is N-bit of data, and N is a positive integer. In some embodiments, the identification key generator 110 may be a physically unclonable function (PUF) device. In some other embodiments, the identification key generator 110 may be a random number generator (RNG) device. The random key checker circuit 120, configured to receive the identification key from the identification key generator, calculates a randomness value of the identification key according to the identification key for checking a randomness of the identification key and generates an output of the identification key with high randomness. The random key checker circuit 120 generates the randomness value as an output filtering flag at the output terminal. The output terminal may be built with a digital logic circuits or a combination of different logic circuits, hence the output terminal in this disclosure is not limited therein.

Figure 2:
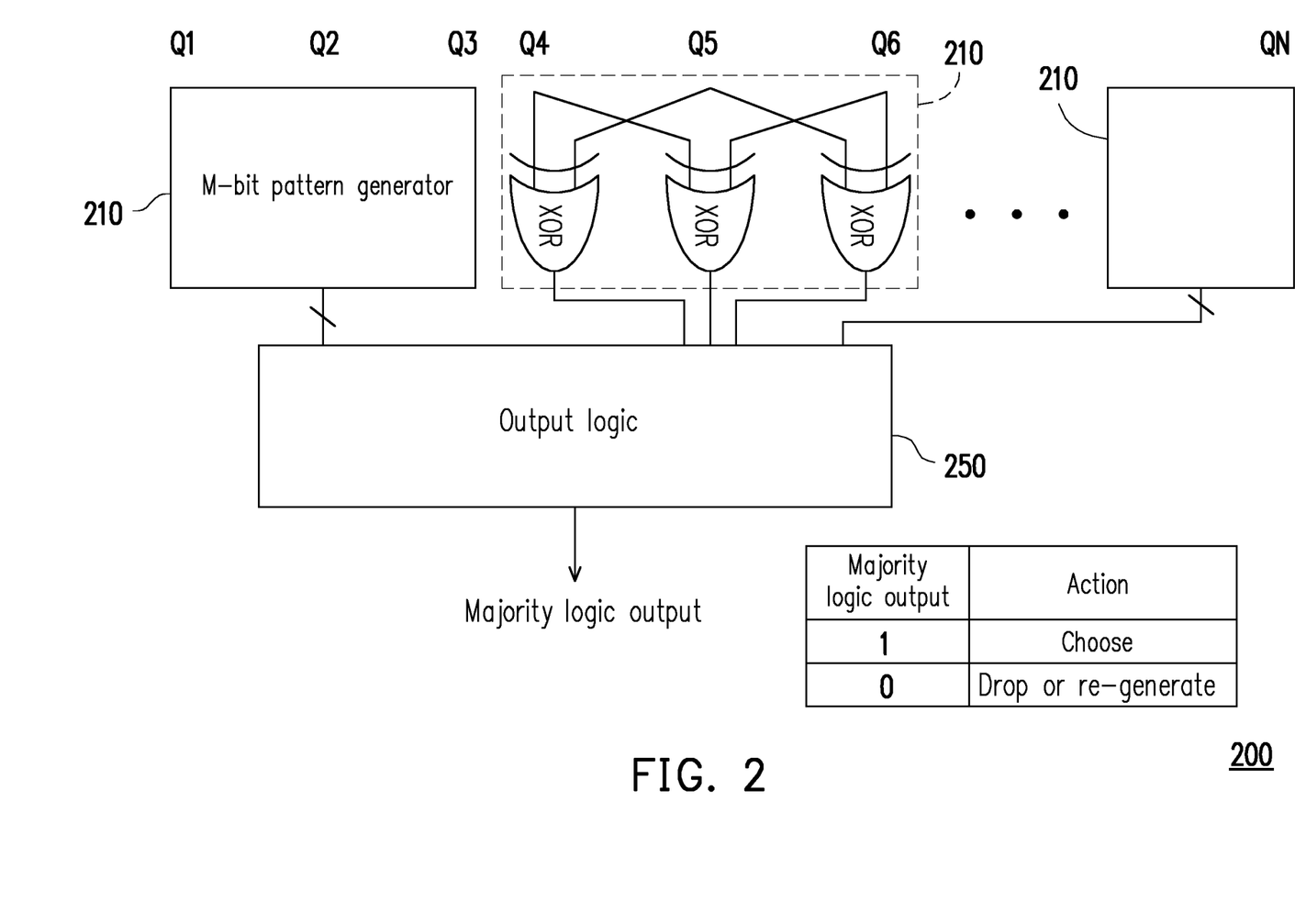
FIG. 2 illustrates a schematic diagram of a random key checker circuit for an electronic device according to an exemplary embodiment of the disclosure.

FIG. 2 illustrates a schematic diagram of a random key checker circuit for an electronic device according to an exemplary embodiment of the disclosure. The random key checker circuit 200 having a plurality of M-bit pattern generator 210 and an output logic 220. Each of the plurality of M-bit pattern generator 210, configured to receive the part bits of the identification key (i.e., M bits of the identification key) to generate a plurality of pattern outputs. The plurality of M-bit pattern generator 210 in the random key check circuit 200 may be a 3-bit pattern generator (i.e., M=3) or a 4-bit pattern generator (i.e., M=4) or a combination of 3-bits and 4-bits according to one example, and M is a positive integer. The M-bit pattern generator 210, receives the identification key from the identification key generator, calculates the M-bit pattern, and the output logic 220 receives each of the M-bit pattern to calculate a randomness value of the identification key and generates an output (i.e., the majority logic output) of the identification key with high randomness by the output logic 250. The output logic 250 in an exemplary embodiment uses at least one digital logic circuit as the output logic, where the digital logic circuit includes a logic gate or different combination of logic gates (e.g., AND, OR, NOT, EXOR, EXNOR, Flip flops, etc.) to implement the digital logic circuit. When the randomness value of the identification key generated by the identification key generator is determined to be logic high (bit value of the output="1"), output the identification key. The identification key with logic high is determined to be an identification key with higher randomness, thus the decryption of the identification key is hard to achieve. Therefore, security of the system has been improved.

On the other hand, when the randomness value of the identification key is determined to be logic low (bit value of the filtering flag="0") by the random key checker circuit, an another identification key is generated by identification key generator to calculate the randomness of the another identification key. In the field of technology, the process of checking another identification key is defined in terms of "drop" or "regenerate" the identification key. In other words, when the randomness of the identification key is low (i.e., bit value of the filtering flag="0"). The identification key is determined to be defective or less secured. Therefore, the identification key with low randomness is dropped (i.e., filter the low random key) or regenerate the identification key until the identification key with higher randomness is achieved. Thus, the device achieves the identification key with high randomness by "drop" or "regenerate" the identification key as a filtering flag when the randomness of the identification key is low.

Figure 3:
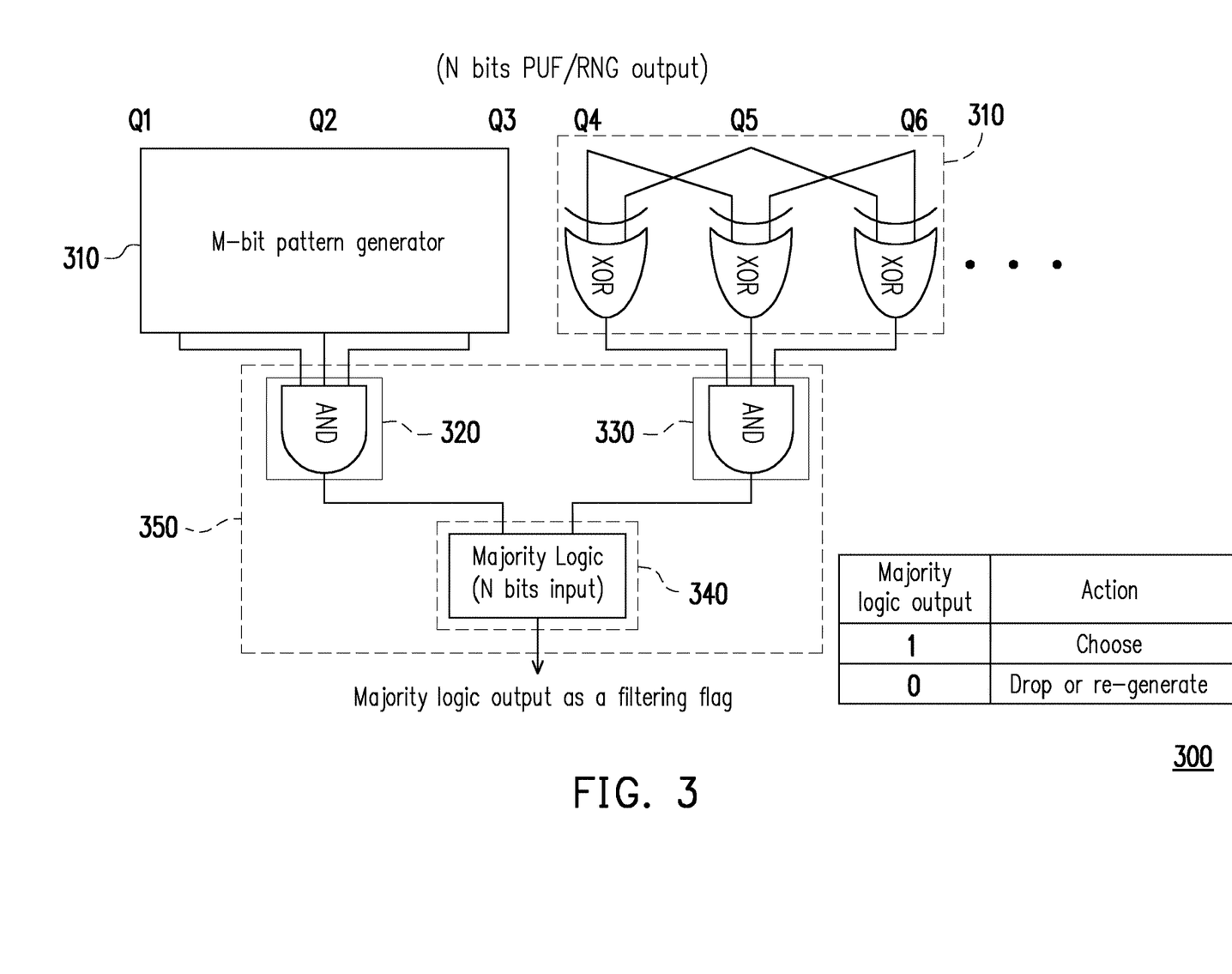
FIG. 3 illustrates a schematic diagram of a random key checker circuit for an electronic device according to an exemplary embodiment of the disclosure.

FIG. 3 illustrates a schematic diagram of a random key checker circuit 300 for an electronic device according to an exemplary embodiment of the disclosure. Referring to FIG. 3, the random key checker circuit 300 having a plurality of M-bit pattern generator 310 is similar to the M-bit pattern generator 210, thus the detailed description of these circuits is omitted herein. The random key checker circuit 300 further includes an output logic 350. The output logic 350 in the exemplary embodiment includes a first digital logic circuit 340, a second digital logic circuit 320, and a third digital logic circuit 330. The first digital logic circuit 340, configured to receive the plurality of pattern outputs from at least one of the plurality of M-bit pattern generator 310 and generates the output of the identification key with high randomness. The second digital logic circuit 320 configured to receive the plurality of pattern outputs from at least one of the plurality of M-bit pattern generator 310 and generates a second digital logic output to the first digital logic circuit 340. The third digital logic circuit 330 configured to receive the plurality of pattern outputs from one of the plurality of M-bit pattern generator 310 and generates a third digital logic output to the first digital logic circuit 340. The second digital logic circuit 320 and third digital logic circuit 330 in this exemplary embodiment uses AND gate. In some other embodiments the second digital logic circuit 320 and the third digital logic circuit 330 may be built with a different logic gate or a combination of logic gates (e.g., AND, OR, NOT, EXOR, EXNOR, Flip flops, etc.). The first digital logic circuit 340 used in this exemplary embodiment is a majority logic (N bits input). In detail, for an example if the N value of an input to the majority logic circuit is 5-bits and the bits received by the majority logic circuit is "11000" the majority number of bits presented in the received input is logic low (i.e., number of "0"=3 and "1"=2). Therefore, the majority logic circuit output is logic low (bit value of the filtering flag="0"). The identification key with low randomness is dropped or regenerated. An another identification key is generated by identification key generator to calculate the randomness of the another identification key. Likewise, the N-bit input bit value received by the majority logic circuit is "11110" the majority number of bits presented in the received input is logic high (i.e., number of "0"=1 and "1"=4). Therefore, the majority logic circuit output is logic high. Output the identification key with high randomness.

Figure 4:
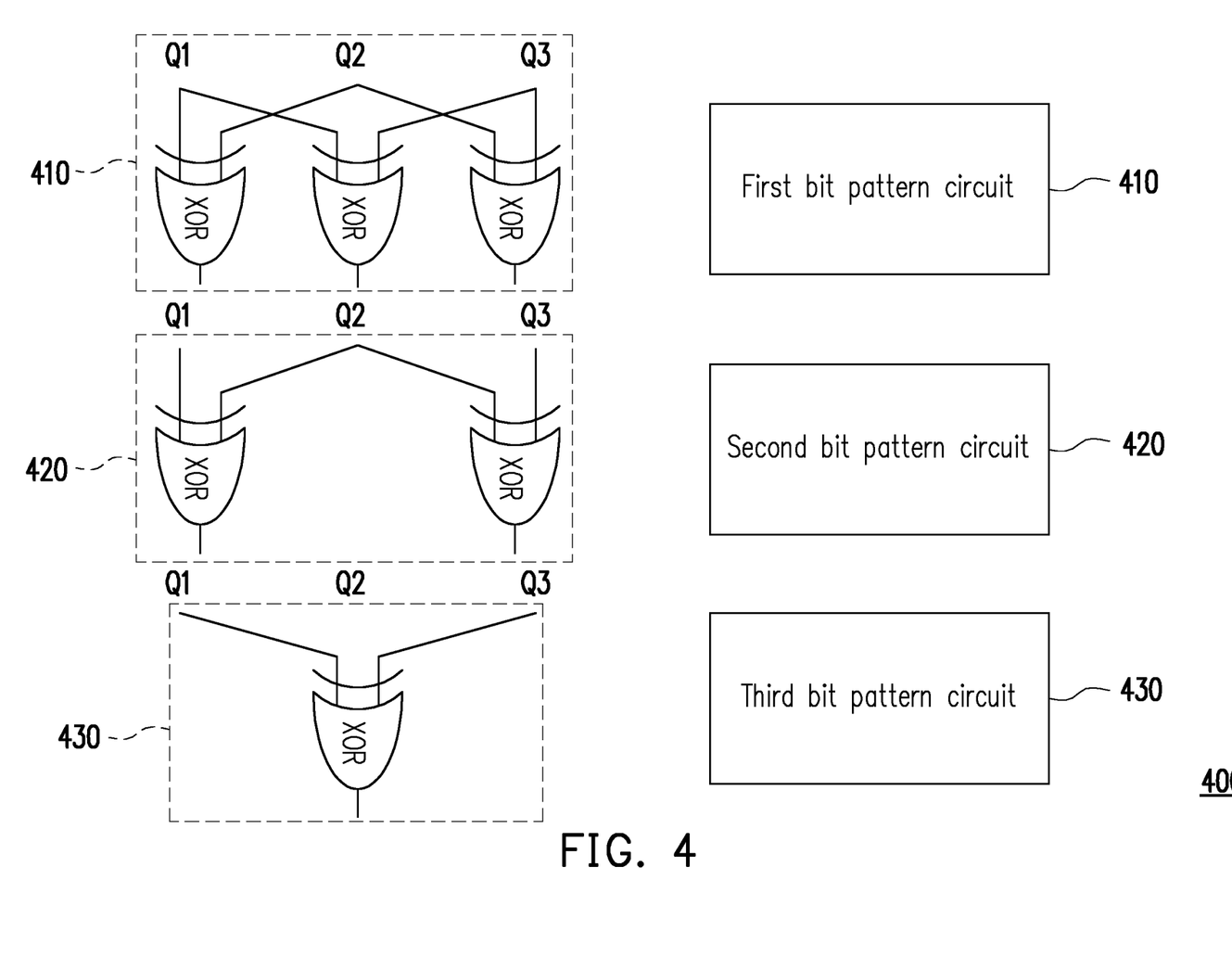
FIG. 4 illustrates a schematic diagram of a M-bit pattern generator according to an exemplary embodiment of the disclosure.

FIG. 4 illustrates a schematic diagram of a M-bit pattern generator 400 according to an exemplary embodiment of the disclosure. With reference to FIG. 2, the random key checker circuit 200 having plurality of M-bit pattern generator 210 to receive the identification key from the identification key generator, calculates a randomness value of the identification key and generates an output of the identification key with high randomness. The M-bit pattern generator 400 configured to generate a plurality of pattern outputs, and M is 3-bit in some exemplary embodiment, but M should be a positive integer, and M value in the disclosure is not limited thereto. The plurality of M-bit pattern generator in the random key checker circuit 200, may be a first bit pattern circuit 410, a second bit pattern circuit 420, and a third bit pattern circuit 430. The first bit pattern circuit 410, configured to receive the identification key to generate a first key. The second bit pattern circuit 420, configured to receive the plurality of pattern outputs from at least one of the plurality of M-bit pattern generator and generates a second key. The third bit pattern circuit 430, configured to receive the plurality of pattern outputs from at least one of the plurality of M-bit pattern generator and generates a third key. In this exemplary embodiment, the first bit pattern circuit 410 may be built with 3 XOR gates and the number of inputs (M-bit value) from the identification key is same as the number of XOR gates in the first bit pattern circuit 410. For an instance, when the input from the identification key for the first bit pattern circuit 410 is Q1, Q2 and Q3. One of the 3 XOR gate in the first bit pattern circuit receives 2 inputs (i.e., Q1 and Q2, or Q2 and Q3 or Q1 and Q3) from the identification key to generate the first key with high randomness.

Similarly, the second bit pattern circuit 420 may be built with 2 XOR gates and the number of inputs (M-bit value) from the identification key is greater than the number of XOR gates in the second bit pattern circuit 420. For an instance, when the input from the identification key for the second bit pattern circuit 420 is Q1, Q2 and Q3. One of the 2 XOR gate in the second bit pattern circuit 420 receives 2 inputs (i.e., Q1 and Q2, or Q2 and Q3 or Q1 and Q3) from the identification key to generate the second key with randomness less than the level of randomness of the first key. The third bit pattern circuit 430 may be built with 1 XOR gate and the number of inputs (M-bit value) from the identification key is greater than the number of XOR gates. In other words, the number of logic gates in the third bit pattern circuit 430 is less than the first bit pattern circuit 410 and the second bit pattern circuit 420. For an instance, when an input from the identification key to the third bit pattern circuit 430 is Q1, Q2 and Q3. The XOR gate in the third bit pattern circuit receives 2 inputs (i.e., Q1, Q2 as an input and Q3 is floating, or Q2, Q3 as an input and Q1 is floating or Q1, Q3 as an input and Q2 is floating) from the identification key to generate the third key with randomness less than the level of randomness of the first key and second key. In other words, the level of randomness of the first key is higher than the second key and third key. Similarly, the level of randomness of second key is higher than the third key. The level of randomness defines the highest filtering level of the identification key. In detail, highest filtering level of the identification key is defined in the factor of 50% of logic high bits and 50% of logic low bits in the identification key i.e., 11110000, when bit value is 8. In some embodiments the first bit pattern circuit 410, second bit pattern circuit 420 and third bit pattern circuit 430 forms a bit pattern circuit with same type of logic gates or different combination of logic gates (e.g., AND, OR, NOT, EXOR, EXNOR, Flip flops, etc.)

Figure 5:
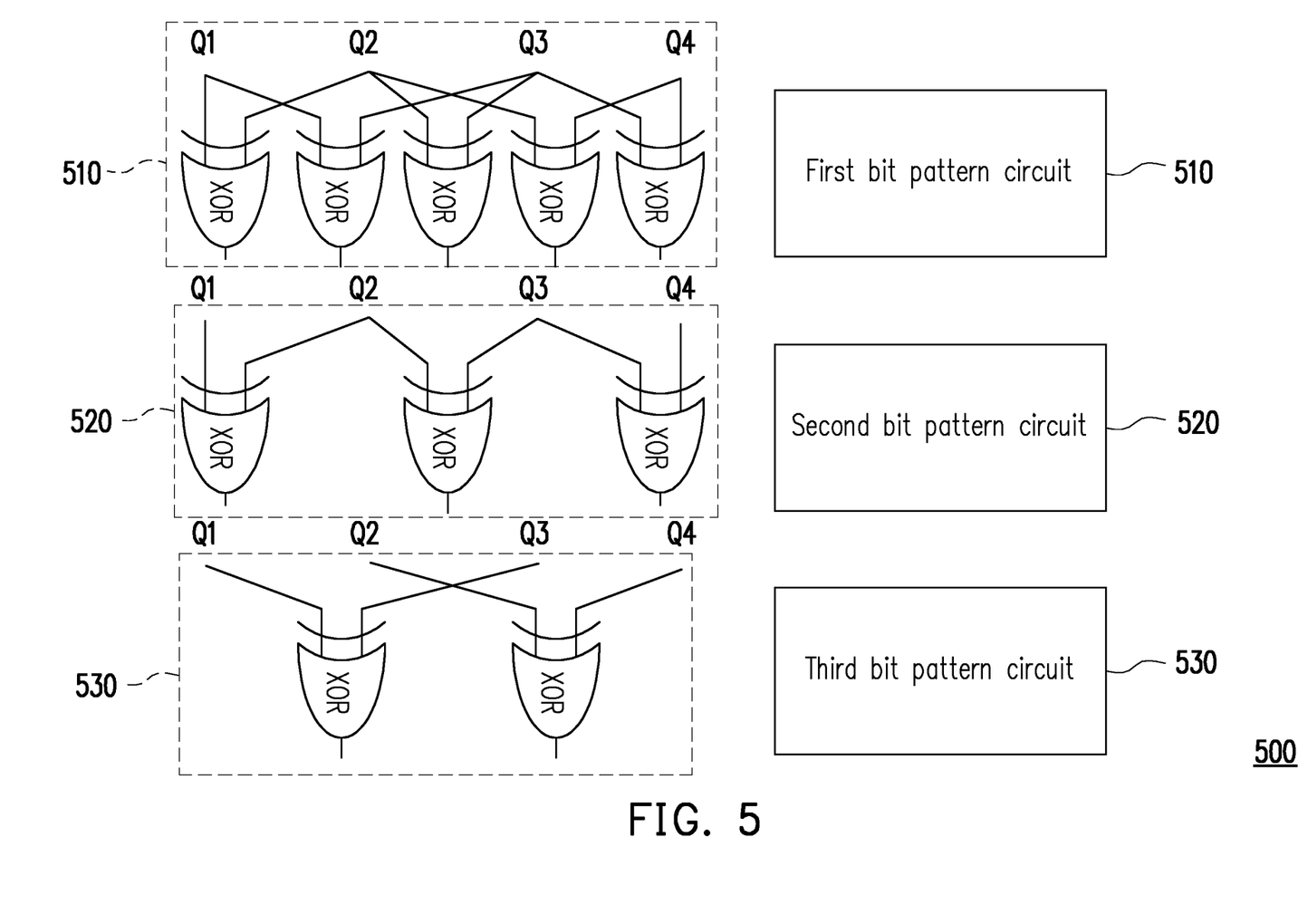
FIG. 5 illustrates a schematic diagram of a M-bit pattern generator according to an exemplary embodiment of the disclosure.

FIG. 5 illustrates a schematic diagram of a M-bit pattern generator according to an exemplary embodiment of the disclosure. With reference to FIG. 2, the random key checker circuit having plurality of M-bit pattern generator to receive the identification key from the identification key generator calculates a randomness value of the identification key and generates the identification key with high random. The M-bit pattern generator 500 configured to generate a plurality of pattern outputs, where M is 4-bit value. With reference to FIG. 4, the first bit pattern circuit 510, the second bit pattern circuit 520 and the third bit pattern circuit 530 are similar to the first bit pattern circuit 410, the second bit pattern circuit 420 and the third bit pattern circuit 430, thus the detailed description of these circuits is omitted herein.

Figure 6:
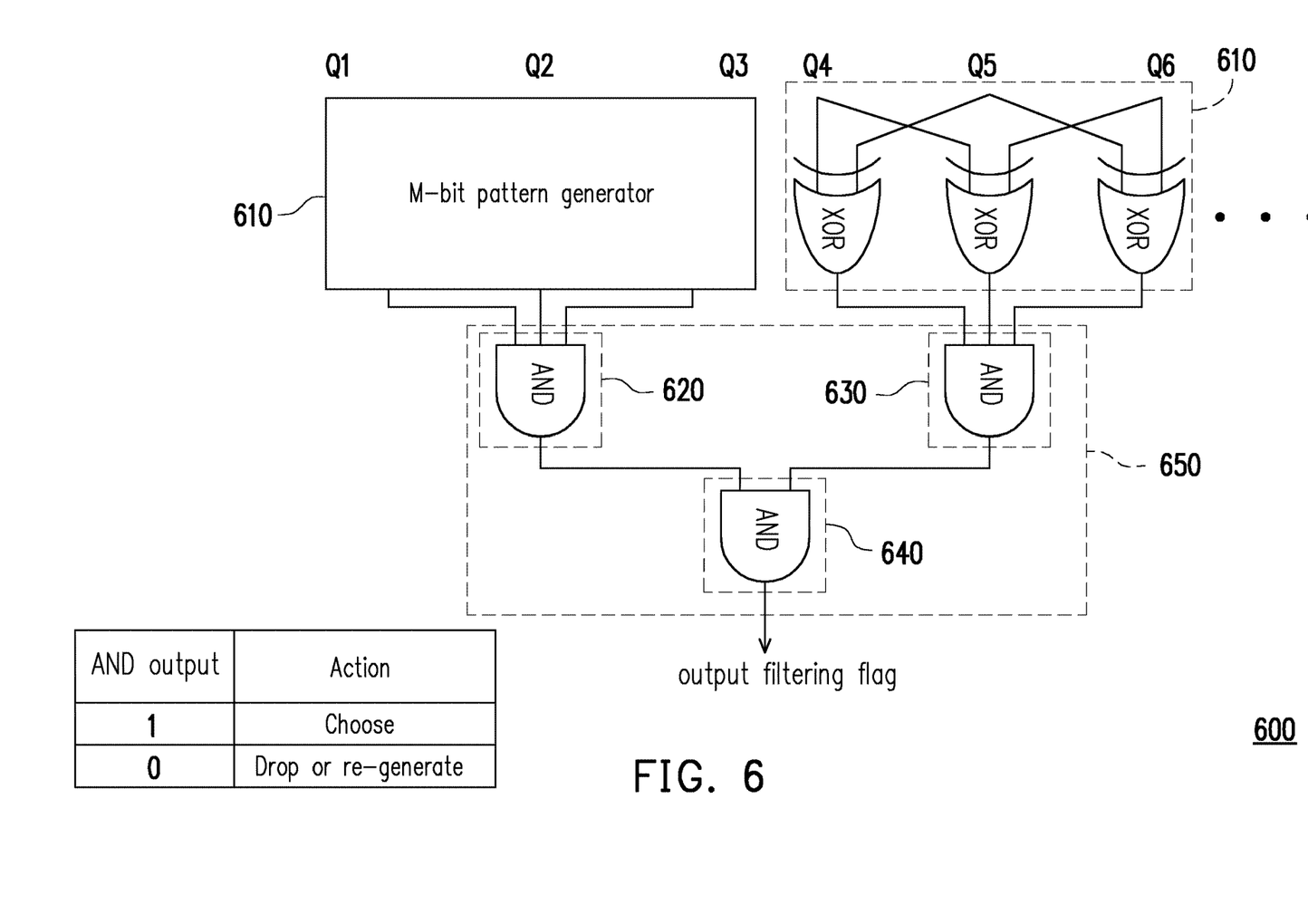
FIG. 6 illustrates a schematic diagram of a random key checker circuit for an electronic device according to an exemplary embodiment of the disclosure.

FIG. 6 illustrates a schematic diagram of a random key checker circuit for an electronic device according to an exemplary embodiment of the disclosure. Referring to FIG. 6, the random key checker circuit 600 having a plurality of M-bit pattern generator 610 is similar to the M-bit pattern generator 210, thus the detailed description of the circuit is omitted herein. The random key checker circuit 600 further includes an output logic 650. The output logic 650 in the exemplary embodiment includes a first digital logic circuit 640, a second digital logic circuit 620, and a third digital logic circuit 630. All the three logic circuits in the output logic 650 in the exemplary embodiment uses AND gate. The operation sequence of the random key checker circuit is similar to FIG. 3; thus, the detailed description of the circuit and the operation are omitted herein.

Figure 7:
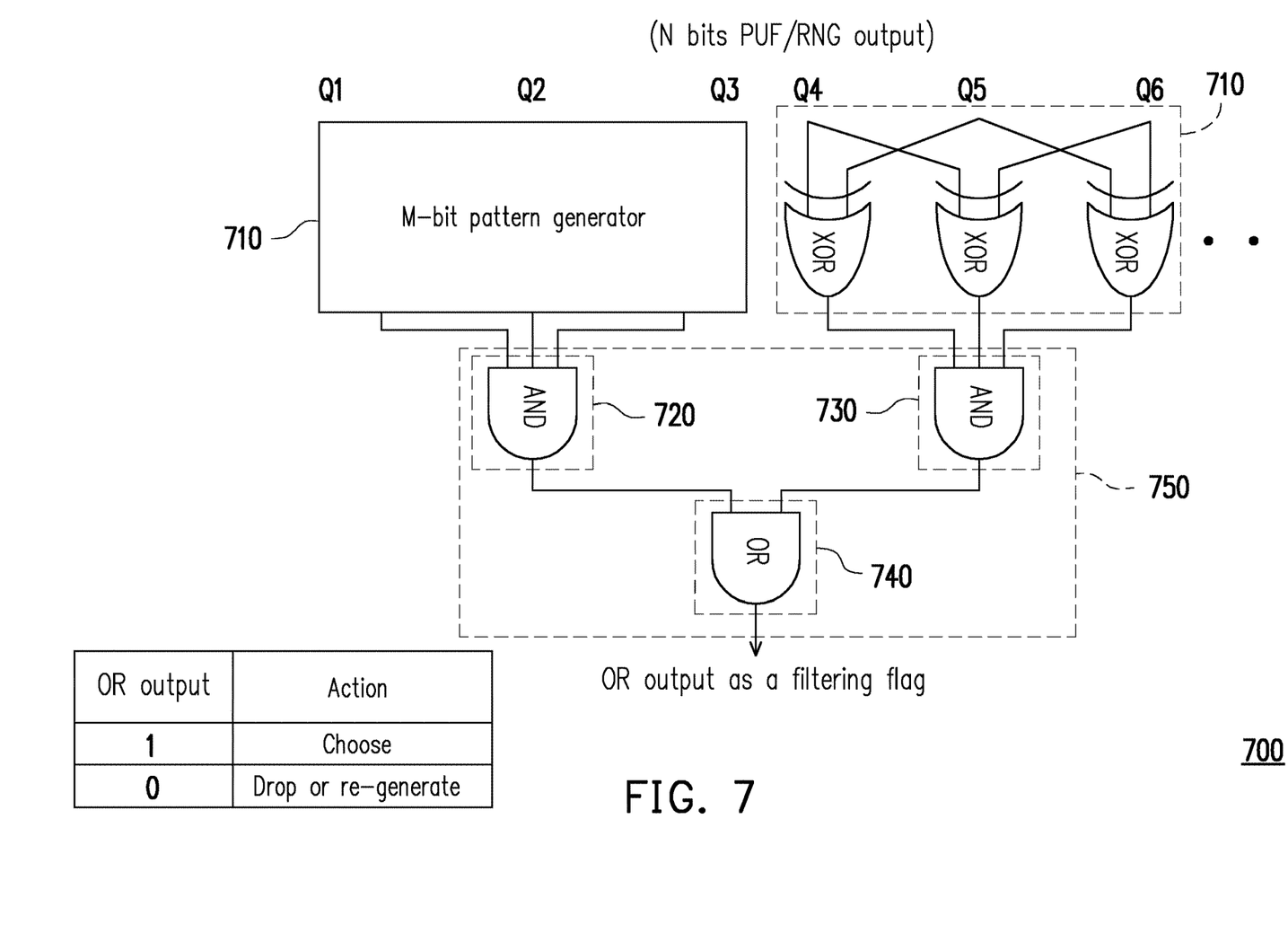
FIG. 7 illustrates a schematic diagram of a random key checker circuit for an electronic device according to an exemplary embodiment of the disclosure.

FIG. 7 illustrates a schematic diagram of a random key checker circuit for an electronic device according to an exemplary embodiment of the disclosure. Referring to FIG. 7, the random key checker circuit 700 having a plurality of M-bit pattern generator 710 is similar to the M-bit pattern generator 210, thus the detailed description of these circuits is omitted herein. The random key checker circuit 700 further includes an output logic 750. The output logic 750 in the exemplary embodiment includes a first digital logic circuit 740, a second digital logic circuit 720, and a third digital logic circuit 730. The first digital logic circuit 740 uses OR gate in the exemplary embodiment. Similarly, the second digital logic circuit 720 and the third digital logic circuit 730 uses AND gate in this embodiment. The operation sequence of the random key checker circuit is similar to FIG. 3; thus, the detailed description of these circuits and the operation are omitted herein.

Figure 8:
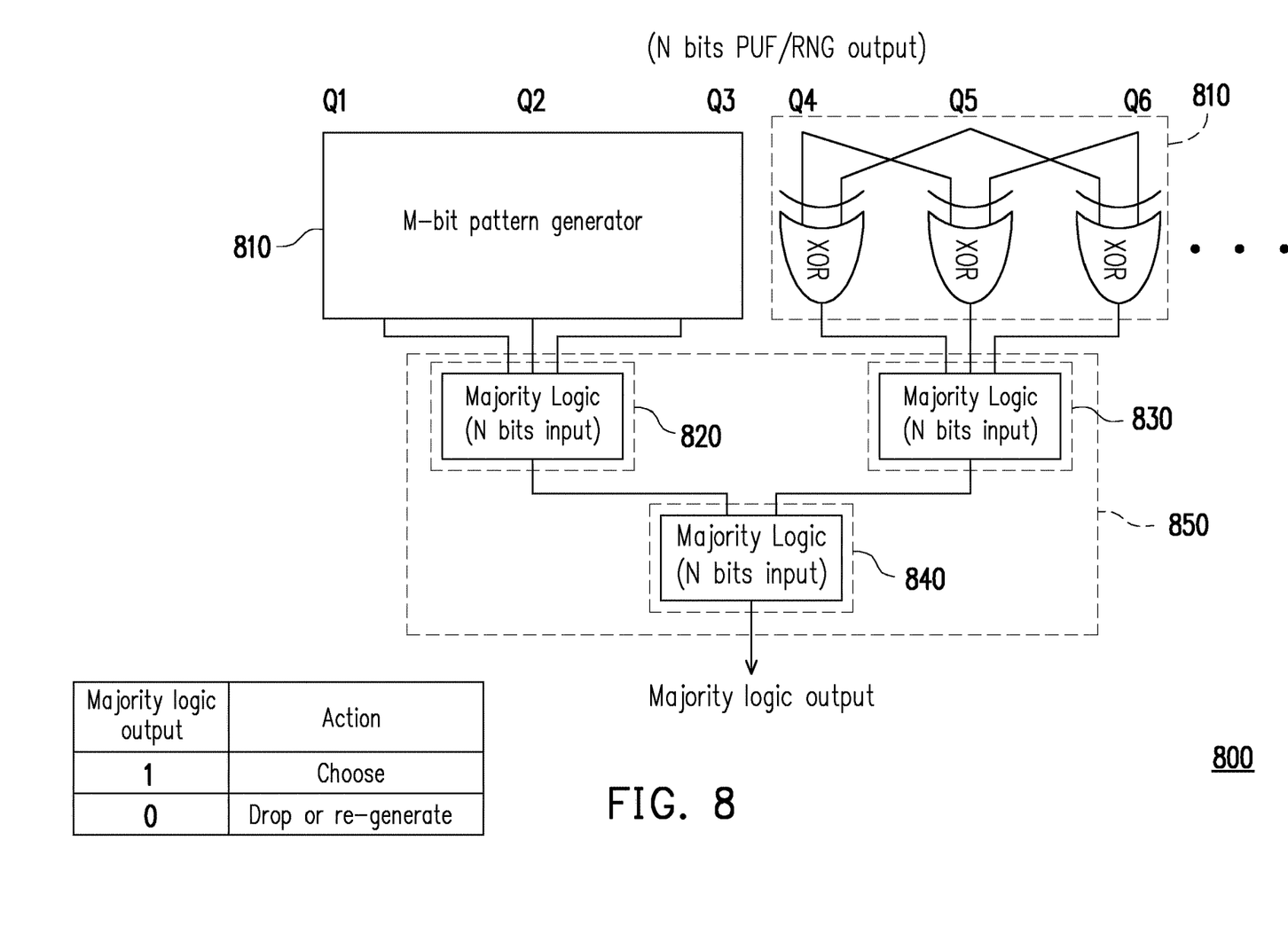
FIG. 8 illustrates a schematic diagram of a random key checker circuit for an electronic device according to an exemplary embodiment of the disclosure.

FIG. 8 illustrates a schematic diagram of a random key checker circuit for an electronic device according to an exemplary embodiment of the disclosure. Referring to FIG. 8, the random key checker circuit 800 having a plurality of M-bit pattern generator 810 is similar to the M-bit pattern generator 210, thus the detailed description of the circuit is omitted herein. The random key checker circuit 800 further includes an output logic 850. The output logic 850 in the exemplary embodiment includes a first digital logic circuit 840, a second digital logic circuit 820, and a third digital logic circuit 830. All the three logic circuits in the output logic 850 in the exemplary embodiment uses majority logic (N bits input). The operation sequence of the random key checker circuit is similar to FIG. 3; thus, the detailed description of these circuit and the operation are omitted herein. It is noted that, the output logic may be construct with same type of logic gates or different combination of logic gates (e.g., AND, OR, NOT, EXOR, EXNOR, Flip flops, etc.) hence the combination of constructing output logic is not limited in the disclosure.

Figure 9:
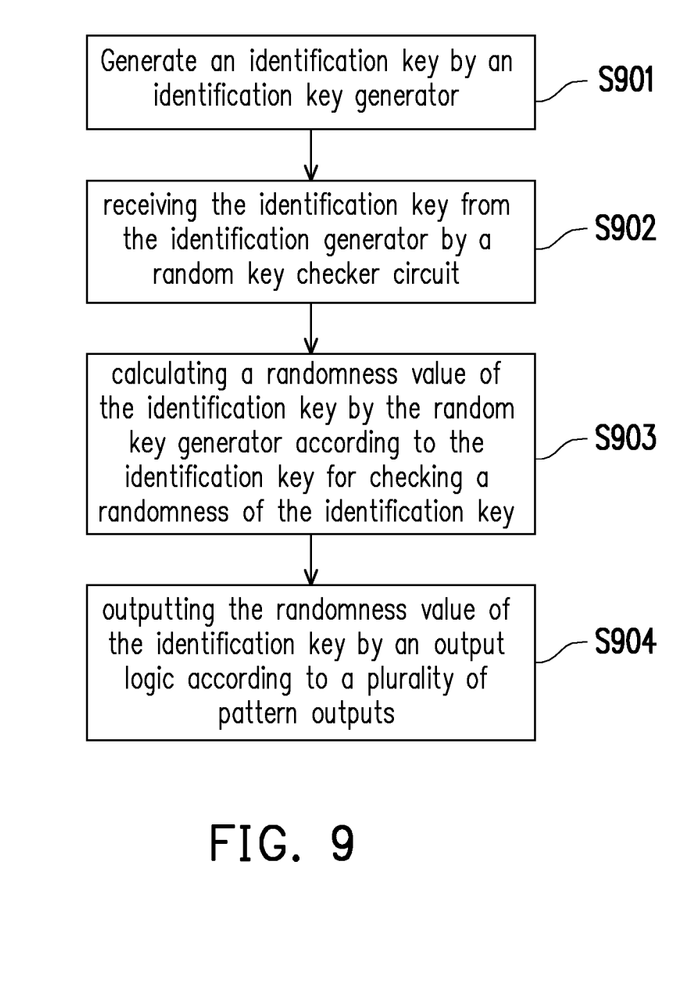
FIG. 9 is a flowchart to illustrate the method for checking randomness for an electronic device according to an exemplary embodiment of the disclosure.

FIG. 9 is a flowchart to illustrate the method for checking randomness for an electronic device according to an exemplary embodiment of the disclosure. Referring to FIG. 9, in step S901, the method generates an identification key by an identification generator with reference to FIG. 1. The identification key is N-bit data, and N is a positive integer. In some embodiments identification key generator is a physically unclonable function (PUF) device. In some other embodiments the identification key generator is a random number generator (RNG) device. In step S902, receiving the identification key from the identification key generator by the random key checker circuit. The random key checker circuit having a plurality of M-bit pattern generator to generate a plurality of pattern outputs. The random key checker circuit using at least one M-bit pattern generator to generate the plurality of pattern outputs. The number of bits in the identification key, N is greater number of logic gates in the second bit pattern circuit and third bit pattern circuit.

In step S903, the M-bit pattern generator calculate a randomness value of the identification key according to the identification key for checking a randomness of the identification key. The randomness value may be calculated based on the embodiments described above, thus the detailed description of calculating the randomness value is omitted herein. In step 904, the output logic in the random key checker circuit outputs a randomness value of the identification key by an output logic according to a plurality of pattern outputs.

Accordingly, the disclosure provides an electronic device for checking a randomness of an identification key device, a random key checker circuit for an electronic device and a method of checking randomness for an electronic device.

In an aspect, the disclosure is directed to an electronic device for checking a randomness of an identification key device which would not limited to which includes an identification key generator, configured to generate an identification key. The random key check circuit configured to receive the identification key from the identification key generator, calculates a randomness value of the identification key according to the identification key for checking a randomness of the identification key and generates an output of the identification key with high randomness.

In an aspect, the disclosure is directed a random key checker circuit for an electronic device which would not limited to which a plurality of M-bit pattern generator, configured to generate a plurality of pattern outputs. Each of the plurality of M-bit pattern generator configured to receive the identification key from the identification key generator, calculates a randomness value of the identification key according to the identification key for checking a randomness of the identification key and generates an output of the identification key with high randomness.

In an aspect, the disclosure is directed to a method of checking randomness for an electronic device, the method would include not limited to: generating an identification key by an identification key generator. Receiving the identification key from the identification generator by a random key checker circuit. Calculating a randomness value of the identification key by the random key checker circuit according to the identification key for checking a randomness of the identification key. Outputting the randomness value of the identification key by an output logic according to a plurality of pattern outputs.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An electronic device for checking a randomness of an identification key device comprising:
    an identification key generator circuit, configured to generate an identification key; and
    a random key checker circuit, configured to receive the identification key from the identification key generator circuit, calculates a randomness value of the identification key according to the identification key for checking a randomness of the identification key and generates an output of the identification key with high randomness,
    wherein the random key checker circuit further comprising:
        a plurality of M-bit pattern generator circuit, configured to generate a plurality of pattern outputs; and
        an output logic configured to receive the plurality of pattern outputs and generates the output of the identification key with high randomness,
        wherein the plurality of M-bit pattern generator circuit comprises a first bit pattern circuit, a second bit pattern circuit, and a third bit pattern circuit,
        wherein a level of randomness of a first key generated by the first bit pattern circuit is higher than a level of randomness of a second key generated by the second bit pattern circuit and a level of randomness of a third key generated by the third bit pattern circuit, and
        the level of randomness of the second key is higher than the third key.

2. The electronic device of claim 1, wherein the output logic comprises:
    a first digital logic circuit, configured to receive the plurality of pattern outputs from at least one of the plurality of M-bit pattern generator circuit and generate the output of the identification key with high randomness.

3. The electronic device of claim 1, wherein the output logic comprises:
    a first digital logic circuit, configured to receive the plurality of pattern outputs from at least one of the plurality of M-bit pattern generator circuit and generates the output of the identification key with high randomness;
    a second digital logic circuit, configured to receive the plurality of pattern outputs from at least one of the plurality of M-bit pattern generator circuit and generates a second digital logic output to the first digital logic circuit; and
    a third digital logic circuit, configured to receive the plurality of pattern outputs from at least one of the plurality of M-bit pattern generator circuit and generates a third digital logic output to the first digital logic circuit.

4. The electronic device of claim 1, wherein if the randomness value of the identification key is logic high, and generates the output of the identification key with high randomness.

5. The electronic device of claim 1, wherein if the randomness value of the identification key is logic low, an another identification key is generated by the identification key generator circuit to calculate the randomness value of the another identification key and checking the randomness of the another identification key.

6. The electronic device of claim 1, wherein the identification key generator circuit s a physically unclonable function (PUF) device.

7. The electronic device of claim 1, wherein the identification key generator circuit is a random number generator (RNG) device.

8. The electronic device of claim 1, wherein the identification key is N-bit data, N is positive integer.

9. The electronic device of claim 1, wherein a number of logic gates in the third bit pattern circuit is less than the first bit pattern circuit and the second bit pattern circuit and a number of logic gates in the second bit pattern circuit is less than the first bit pattern circuit.

10. A random key checker circuit for an electronic device comprises:
    a plurality of M-bit pattern generator circuit, configured to generate a plurality of pattern outputs,
    wherein each of the plurality of M-bit pattern generator circuit configured to receive the identification key from the identification key generator circuit, calculates a randomness value of the identification key according to the identification key for checking a randomness of the identification key and generates an output of the identification key with high randomness,
    wherein the plurality of M-bit pattern generator circuit comprises a first bit pattern circuit, a second bit pattern circuit, and a third bit pattern circuit,
    wherein a level of randomness of a first key generated by the first bit pattern circuit is higher than a level of randomness of a second key generated by the second bit pattern circuit and a level of randomness of a third key generated by the third bit pattern circuit, and
    the level of randomness of the second key is higher than the third key; and
    an output logic configured to receive the plurality of pattern outputs and generate the output of the identification key with high randomness.

11. The random key checker circuit according to claim 10, wherein the output logic comprises:
   a first digital logic circuit, configured to receive the plurality of pattern outputs from at least one of the plurality of M-bit pattern generator circuit and generates the output of the identification key with high randomness.

12. The random key checker circuit according to claim 10, wherein the output logic comprises:
   a first digital logic circuit, configured to receive the plurality of pattern outputs from at least one of the plurality of M-bit pattern generator circuit and generates the output of the identification key with high randomness;
   a second digital logic circuit, configured to receive the plurality of pattern outputs from at least one of the plurality of M-bit pattern generator circuit and generates a second digital logic output to the first digital logic circuit; and
   a third digital logic circuit, configured to receive the plurality of pattern outputs from at least one of the plurality of M-bit pattern generator circuit and generates a third digital logic output to the first digital logic circuit.

13. The random key checker circuit according to claim 11, wherein if the randomness value of the identification key is logic high, and generates the output of the identification key with high randomness.

14. The random key checker circuit according to claim 10, wherein if the randomness value of the identification key is logic low, an another identification key is generated by the identification key generator circuit to calculate the randomness value of the another identification key and checking the randomness of the another identification key.

15. The random key checker circuit according to claim 11, wherein a number of logic gates in the third bit pattern circuit is less than the first bit pattern circuit and the second bit pattern circuit and a number of logic gates in the second bit pattern circuit is less than the first bit pattern circuit.

16. A method of checking randomness for an electronic device comprising:
   generating an identification key by an identification key generator circuit; and
   receiving the identification key from the identification generator circuit by a random key checker circuit;
   calculating a randomness value of the identification key by the random key checker circuit according to the identification key for checking a randomness of the identification key;
   generating a plurality of pattern outputs by a plurality of M-bit pattern generator circuit, wherein the M-bit pattern generator includes a first bit pattern circuit, a second bit pattern circuit, and a third bit pattern circuit; and
   outputting identification key with high randomness by an output logic according to the plurality of pattern outputs,
   wherein a level of randomness of a first key generated by a first bit pattern circuit in the M-bit pattern generator circuit is higher than a level of randomness of a second key generated by the second bit pattern circuit in the M-bit pattern generator circuit and a level of randomness of a third key generated by the third bit pattern circuit in the M-bit pattern generator circuit, and
   the level of randomness of the second key is higher than the third key.

17. The method according to claim 5, wherein the output logic comprises:
   a first digital logic circuit, configured to receive the plurality of pattern outputs from at least one of the plurality of M-bit pattern generator circuit and generates an output of the identification key with high randomness.

18. The method according to claim 17, wherein the output logic comprises:
   a first digital logic circuit, configured to receive the plurality of pattern outputs from at least one of the plurality of M-bit pattern generator circuit and generates the output of the identification key with high randomness,
   a second digital logic circuit, configured to receive the plurality of pattern outputs from at least one of the plurality of M-bit pattern generator circuit and generates a second digital logic output to the first digital logic circuit, and
   a third digital logic circuit, configured to receive the plurality of pattern outputs from at least one of the plurality of M-bit pattern generator circuit and generates a third digital logic output to the first digital logic circuit.

19. The method according to claim 17, wherein if the randomness value of the identification key is logic high, and generates the output of the identification key with high randomness,
   if the randomness value of the identification key is logic low, an another identification key is generated by the identification key generator circuit to calculate the randomness value of the another identification key and checking the randomness of the another identification key.

20. The method according to claim 17, wherein a number of logic gates in the third bit pattern circuit is less than the first bit pattern circuit and the second bit pattern circuit and a number of logic gates in the second bit pattern circuit is less than the first bit pattern circuit.

* * * * *